Nov. 26, 1935.  R. G. AINSWORTH ET AL  2,022,306
BALANCE
Filed July 30, 1932  2 Sheets-Sheet 1
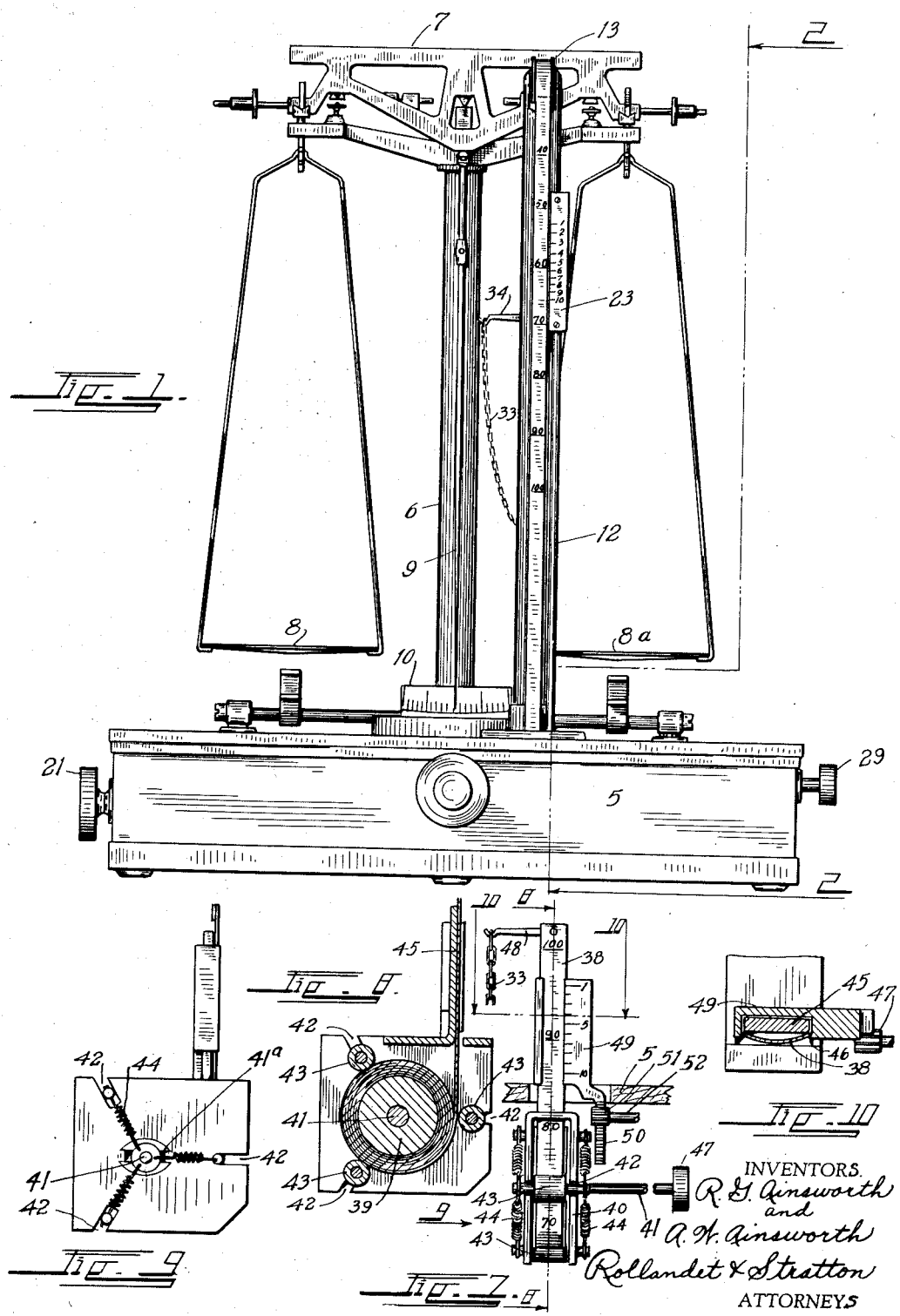
INVENTORS.
R. G. Ainsworth
and
A. H. Ainsworth
Rollandet & Stratton
ATTORNEYS Nov. 26, 1935.  R. G. AINSWORTH ET AL  2,022,306
BALANCE
Filed July 30, 1932   2 Sheets-Sheet 2
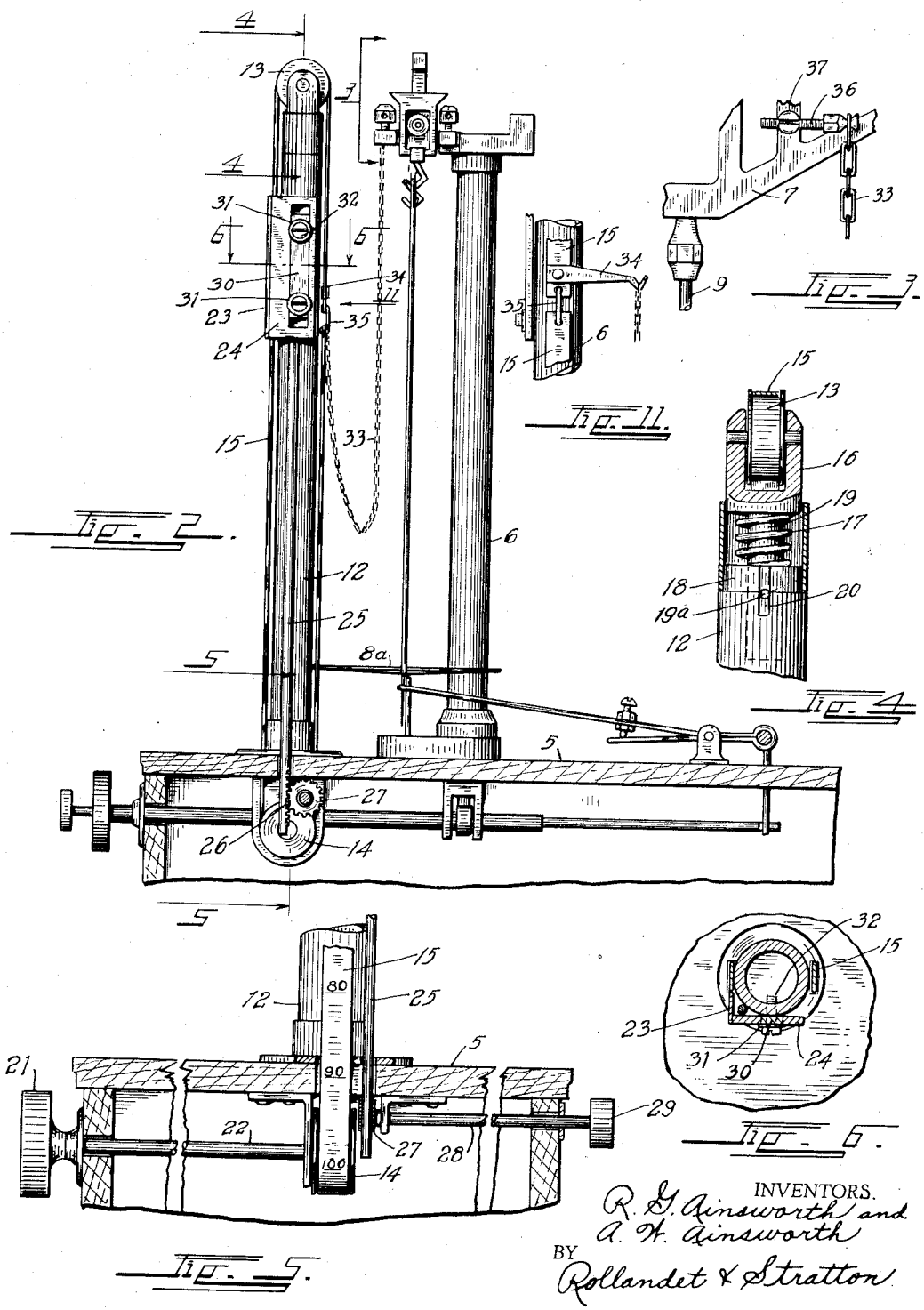
INVENTORS.
R. G. Ainsworth and
A. H. Ainsworth
BY Rollandet & Stratton
ATTORNEYS.

Patented Nov. 26, 1935

2,022,306

UNITED STATES PATENT OFFICE 2,022,306

BALANCE

Robert G. Ainsworth and Alfred W. Ainsworth, Denver, Colo., assignors to William Ainsworth & Sons, Inc., Denver, Colo.

Application July 30, 1932, Serial No. 626,276

21 Claims. (Cl. 265—60)

This invention relates to balances of the precision type in which the weight of small and light objects may be accurately determined through the medium of an adjustable counterbalancing chain.

In balances of this character, a chain composed of links of substantially uniform weight is hung in a catenary curve between an arm of the beam of the balance opposite to that from which the load-pan is suspended, and an adjustable carrier.

Heretofore the chain-carrier has been constructed to move along a fixed scale upon which the weight of the object on the pan is read by the relative position of a zero-mark on the carrier, and it is an object of the present invention to simplify the construction of the instrument and at the same time promote the accuracy of its load-balancing adjustments by attaching the chain directly to a scale which moves relative to a normally stationary zero-mark.

To further increase the precision of the instrument by minute adjustments, the zero-mark in the improved construction is associated with a vernier, which is adjustable lengthwise of the scale, to determine the weight of the object on the load-pan of the beam in fractions of the units in which the scale is divided.

Other objects of the invention reside in details of construction and in novel and advantageous arrangements and combinations of parts as will be fully disclosed in the course of the following description.

An embodiment of the invention has been illustrated in the accompanying drawings in the several views of which like parts are similarly designated and in which Figure 1 represents a front-view of a precision balance constructed in accordance with the present invention, Figure 2 is a section taken on the line 2—2, Figure 1, Figure 3 is a partially broken side view of the beam of the balance looking in the direction of the arrow 3 in Figure 2, showing the method of attaching an end of the weighing-chain to the beam, Figure 4 is an enlarged section along the line 4—4, Figure 2, Figure 5 is a section taken on the line 5—5, Figure 2, Figure 6 is an enlarged cross-section on the line 6—6, Figure 2, Figure 7 is a sectional elevation of a modified form of the chain-carrying scale of the invention, Figure 8 is a section along the line 8—8, Figure 7, Figure 9 is a side view looking in the direction of the arrow 9 in Figure 7, Figure 10 is an enlarged transverse section on the line 10—10 of Figure 7, and Figure 11, a face-view of the connected ends of the weighing chain, looking in the direction of the arrow 11—11, Figure 2.

Referring further to the drawings, the balance 10 comprises as usual a hollow base 5, a column 6 on the base, a beam 7 fulcrumed upon the upper end of the column, pans 8 and 8a suspended from the ends of the beam, and a pointer 9 on the beam cooperating with a scale 10 at the foot of the column.

In addition to these, the principal elements of the scale-construction, the instrument includes the various adjustments, movement-arresting devices and other appurtenances usually found in balances of this character, but since all such elements and appliances are not a part of the present invention and may be varied in form, construction and arrangement without affecting the operation of the invention, no further explanation of their specific character or relative positions is thought necessary.

The instrument is, as usual, enclosed in a glass case, not shown in the drawings.

In the preferred form illustrated in Figures 1 to 6 inclusive of the drawings, the equilibrating element of the present invention comprises a hollow column 12 mounted on the base, forward of the instrument hereinbefore described. At the upper end of the column 12, and below the column within the base of the instrument respectively are two flanged sheaves 13 and 14, upon which is supported a flexible tape 15, preferably made of steel which constitutes the movable scale to which the chain is attached.

In order to maintain the tape in a constant state of tension, the upper sheave is mounted upon a block 16 which fits slidably in the upper end of the column 12. The block is supported upon a spiral spring 17 which rests on a stop 18 inside the column. The block may have a stem 19 extending through the spring and through an opening of the stop to prevent binding of the block inside the column. A pin 19a on the stem moving in a slot 20 of the column holds the block against rotary displacement. Vertical movement of the tape is effected from outside the base by means of a knob 21 at the end of a shaft 22 upon which the lower sheave 14 is fixed, the shaft being rotatably supported in suitable bearings inside the base of the instrument.

Vertically movably mounted on the column is a vernier-plate 23, the face of which is alined with the foremost face of the tape. The plate is fastened upon a slotted carrier 24 fixed at the end of a rod 25 which passes through an opening of the base. The lower portion of the rod is toothed to provide a rack 26, which is engaged by a pinion 27 on a shaft 28 rotatably mounted in suitable bearings inside the base. A knob 29 at the end of the shaft, outside the base, provides for its manual rotation.

A strip 30 fastened upon a side of the column, fits in the slot of the carrier to guide the latter in its up and downward movements and washers 31, held by screws 32 on the strip, engage the outer surface of the sliding carrier, to prevent its lateral displacement. The chain constituting the variable weight of the instrument, is designated in the drawings by the reference numeral 33.

The chain is at one end suspended from a hook 34 which extends laterally from the endless tape at the rear side of the column 12, the ends of the tape being held together by means of a link 35.

The opposite end of the chain is suspended from the grooved head of a screw 36, which extends through a threaded aperture of a stud 37 projecting from an arm of the beam 7. The screw permits of varying the distance between the point of suspension of the chain and the fulcrum of the beam. The tape bears a scale divided into graduations representing small units of weight, in the present instance milligrams, and the face of the vernier plate alined with the graduated face of the tape bears a scale divided into fractional parts of the units of the other scale, in this instance, tenths of a milligram. The edges of the tape and the scale are closely adjacent each other and the respective scales extend to said edges so that their graduations may register one with the other as shown in Figure 1.

In the operation of the instrument, the pointer 9 is first brought to a central position relative to the index scale 10, showing that the beam of the scale is in balance, by movement of the chain through the medium of the movable tape 15. The vernier plate is then moved by rotation of the shaft 28 until its zero-point coincides with the zero-point of the scale on the tape, and the instrument is ready for use.

It will be apparent that the part of the chain suspended from an arm of the beam, may counterbalance a load placed on the pan suspended from the other arm of the beam, according to its length, i. e., the combined weights of its links, while the other part of the chain, suspended from the movable tape, is merely a source from which one or more links may be added or detracted from the active part of the chain.

After the object to be weighed has been placed on the load-pan 8 of the instrument, the beam is readily and accurately equilibrated by movement of the tape, which, as stated before, adds to or lessens the weight of the active part of the chain suspended from the beam.

The graduation on the chain registering with the zero-point of the vernier plate after the beam is again in balance, indicates the weight of the load on the pan 8 in milligrams and the weight may be ascertained to a minute nicety, in tenths of milligrams by reading the vernier.

A modification of the above described construction has been illustrated in Figures 7 to 10 of the drawings. The endless tape has been replaced by one which will remain in a straight and upright condition without holding means other than those by which it is supported on the base of the instrument.

The tape 38 is, to this end, transversely concaved as shown in Figure 10. It is wound upon a reel 39 mounted inside the base 5 in a U-shaped housing 40. The spindle 41 of the reel is movable in slots 41a in the sides of the housing 40 and three rollers 43 bear upon the tape on the reel to compensate for its variation in diameter. One of the rollers is stationary and the other two move in radial slots 42 of the plates, and coiled springs 44 connect the rollers with the spindle of the reel at the outside of the plates. A bar 45, integrally connected with the housing, projects a short distance above the base 5, to guide the tape in its vertical movement.

The spindle 41 of the reel extends through an opening of the base and has at its end a milled knob 47 for its manual rotation similar to the knob 21 of the first described construction. The tape carries at its upper end, a hook 48 for the attachment of the weighing chain 33 and it bears upon its face a graduated scale similar to that on the endless tape 15.

A vernier 49 immediately above the base is vertically slidable and it has a rack 50 which meshes with a pinion 51 on a shaft 52, which, as in the first described construction, extends through an opening in a side of the base, and has a knob for its manual rotation. The vernier has inwardly projecting flanges 46 which engage the outer surface of the tape 38 to prevent its displacement.

It is to be understood that other variations in the form and arrangment of the parts of the construction herein described, may be made without departing from the spirit and scope of the invention.

What we claim and desire to secure by Letters Patent is:

1. In a balance, the combination with a fulcrumed beam, of an indicatory element, a flexible scale-bearing element lengthwise movable in cooperative relation to the indicatory element, and a weighing chain suspended from said movable element and from the beam at a side of its fulcrum.

2. In a balance, the combination with a fulcrumed beam, of a flexible graduated element mounted for lengthwise movement, a vernier cooperative with the element and mounted for adjustment in the direction of the lengthwise movement thereof, and a weighing chain suspended from the movable element and from the scale-beam at a side of its fulcrum.

3. In a balance, the combination with a fulcrumed beam, of a vertically movable tape bearing a scale, an indicatory element cooperating with the scale on the tape, and a weighing-chain suspended from the tape and from the beam at a side of its fulcrum.

4. In a balance, the combination with a fulcrumed beam, of a vertically movable tape bearing a scale, a vernier cooperating with the scale on the tape and mounted for adjustment in the direction of movement of the same, and a weighing chain suspended from the tape and from the scale-beam at a side of its fulcrum.

5. In a balance, the combination with a fulcrumed beam, of a vertically movable endless tape bearing a scale, an indicatory element cooperating with the scale on the tape, and a weighing-chain suspended from the tape and from the beam at a side of its fulcrum.

6. In a balance, the combination with a fulcrumed beam, of a support, sheaves at opposite ends of the support, a flexible graduated tape on the sheaves, an indicatory element on the support, cooperative with graduations on the tape, a weighing-chain suspended from the tape and from the beam at a side of its fulcrum, and means for rotating one of the sheaves.

7. In a balance, the combination with a fulcrumed beam, of a support, sheaves at opposite ends of the support, a flexible graduated tape on the sheaves, an indicatory element on the support, cooperative with graduations on the tape, a weighing-chain suspended from the tape and from the beam at a side of its fulcrum, means for tensioning the tape, and means for rotating one of the sheaves.

8. In a balance, the combination with a fulcrumed beam, of a support, sheaves at opposite ends of the support, a flexible graduated tape on the sheaves, an indicatory element on the support, cooperative with graduations on the tape, a weighing-chain suspended from the tape and from the beam at a side of its fulcrum, means for tensioning the tape by resilient action upon one of the sheaves, and means for rotating one of the sheaves.

9. In a balance, the combination with a fulcrumed beam, of a support, sheaves at opposite ends of the support, a flexible graduated tape on the sheaves, a vernier movable on the support in cooperative relation to graduations on the tape, a weighing-chain suspended from the tape and from the beam at a side of its fulcrum, means for rotating one of the sheaves, and means for adjustment of the vernier.

10. In a balance, the combination with a fulcrumed beam, of a support, sheaves at opposite ends of the support, a flexible graduated tape on the sheaves, a vernier movable on the support in cooperative relation to graduations on the tape, a weighing-chain suspended from the tape and from the beam at a side of its fulcrum, means for rotating one of the sheaves, a rack on the vernier, and a rotary shaft having a pinion meshing with the rack for adjustment of the vernier.

11. In a balance, the combination with a fulcrumed beam, of a lengthwise movable graduated tape, a winding reel for the tape, means for rotation of the reel, an indicatory element cooperative with graduations on the tape, and a chain suspended from the tape and from the beam at a side of its fulcrum.

12. In a balance, the combination with a fulcrumed beam, of a lengthwise movable graduated tape, a winding reel for the tape, means for rotation of the reel, tensioning means engaging the tape on the reel, an indicatory element cooperative with graduations on the tape, and a chain suspended from the tape and from the beam at a side of its fulcrum.

13. In a balance, the combination with a fulcrumed beam, of a lengthwise movable graduated tape, a winding reel for the tape, means for rotation of the reel, an adjustable vernier cooperative with graduations on the tape, and a chain suspended from the tape and from the beam at a side of its fulcrum.

14. In a balance, a column, an endless graduated tape movable about the column, the column having a hollowed end portion, a block movable in said hollowed portion, a sheave carried by the block and engaging the tape, and spring means yieldingly resisting movement of the block in the hollowed portion to thereby tension the tape.

15. In a balance, a column, an endless graduated tape movable about the column, the column having a hollowed end portion, a block movable in said hollowed portion, a sheave carried by the block and engaging the tape, spring means yieldingly resisting movement of the block in the hollowed portion to thereby tension the tape, and a stop cooperating with said spring means to limit the movement of the block in said hollowed portion.

16. In a balance, a column, an endless graduated tape movable about the column, the column having a hollowed end portion, a block movable in said hollowed portion, a sheave carried by the block and engaging the tape, spring means yieldingly resisting movement of the block in the hollowed portion to thereby tension the tape, and means to prevent rotary displacement of the block.

17. In a balance, a column, a rod movable longitudinally of the column, a slotted carrier supported by said rod, a strip on the column fitted in the slot of the carrier to guide same in its movements, a vernier mounted on the carrier, and means to prevent lateral displacement of the carrier.

18. In a balance, the combination with a fulcrumed beam, of a movable tape bearing a scale on one surface thereof, an indicatory element cooperating with the scale on the tape, and a weighing-chain suspended from the tape and from the beam at a side of its fulcrum.

19. In a balance, an endless tape, a winding reel supporting the tape for its lengthwise movement, a slotted housing for the reel, a plurality of rollers in said slots and bearing on the tape carried by the reel, one of said rollers being in a fixed position relative to the reel, the other of said rollers being movable relative to the fixed roller, and spring means cooperating with the rollers to cause same to bear upon the tape carried on the reel to thereby tension same.

20. In a balance, the combination with a fulcrumed beam, of a vertically movable flexible tape bearing a scale, a vertically adjustable indicatory element provided with a scale, cooperating with the scale borne by the flexible tape to form a vernier, and a weight-chain suspended from the tape and from the beam at one side of its fulcrum.

21. In a balance, the combination with a fulcrumed beam of a vertically movable, endless flexible tape, two spaced sheaves for supporting the endless tape, the latter enclosing the two sheaves, means for maintaining the tape under tension, a scale on one side of the tape, a vertically movable indicatory element, provided with a scale located adjacent the scale borne by the tape, the two scales cooperating to form a venier, and a weight-chain suspended from the tape and from the beam on one side of its fulcrum.

ROBERT G. AINSWORTH.
ALFRED W. AINSWORTH.